(12) United States Patent
    Mueller

(10) Patent No.: US 10,843,789 B2
(45) Date of Patent: Nov. 24, 2020

(54) SELECTIVELY ENGAGEABLE AIRCRAFT DRIVESHAFT USING FRICTION PLATES

(71) Applicant: Bell Helicopter Textron Inc., Fort Worth, TX (US)

(72) Inventor: Russell L. Mueller, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 210 days.

(21) Appl. No.: 15/920,195

(22) Filed: Mar. 13, 2018

(65) Prior Publication Data

US 2019/0283858 A1    Sep. 19, 2019

(51) Int. Cl.
    *B64C 3/56*     (2006.01)
    *F16D 13/40*    (2006.01)
    *F16C 3/02*     (2006.01)

(52) U.S. Cl.
    CPC ............. *B64C 3/56* (2013.01); *F16C 3/023* (2013.01); *F16D 13/40* (2013.01)

(58) Field of Classification Search
    CPC ........ B64D 35/00; B64D 35/02; B64D 35/04; B64C 27/12; B64C 2027/125; F16D 3/06; F16D 13/40; F16D 23/12; F16D 47/02
    USPC ................................................. 464/107, 109
    See application file for complete search history.

(56) References Cited

U.S. PATENT DOCUMENTS

| 2,398,261 A * | 4/1946 | Stone .................... F16D 47/02 192/45.017 |
| 2009/0227415 A1 * | 9/2009 | Buelna ................ B64C 29/0033 475/346 |
| 2016/0076629 A1 * | 3/2016 | Modrzejewski .......... F16H 3/58 244/17.11 |
| 2019/0256202 A1 * | 8/2019 | Resnick .................. B64C 27/08 |

* cited by examiner

*Primary Examiner* — Timothy D Collins
*Assistant Examiner* — Terri L Filosi
(74) *Attorney, Agent, or Firm* — Lightfoot & Alford PLLC

(57) ABSTRACT

Systems and methods include providing an aircraft with a fuselage and a wing assembly rotatable relative to the fuselage about a stow axis between a flight position and a stowed position. The aircraft includes an engine reduction gearbox ("ERGB") having a retractable driveshaft assembly with an actuation shaft and a first friction plate. Actuation of the retractable driveshaft assembly by the actuation shaft causes the first friction plate to selectively engage and disengage a second friction plate associated with a mid-wing gearbox ("MWGB") via axially translatable motion of the retractable driveshaft assembly along its rotation axis. When the friction plates are engaged, rotation of the retractable driveshaft assembly imparts rotation to at least one rotor assembly. When the friction plates are disengaged, the wing assembly is capable of selectively rotation with respect to the fuselage about the stow axis between the flight position and the stowed position.

19 Claims, 6 Drawing Sheets

SELECTIVELY ENGAGEABLE AIRCRAFT DRIVESHAFT USING FRICTION PLATES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Many types of aircraft often include elongated wings that extend laterally from a fuselage of the aircraft. These types of aircraft generally occupy a large amount of space and have a large overall footprint. As such, when these types of aircraft are not in use, they occupy an undeniable amount of storage space on aircraft carriers, in storage facilities, or other areas. Further, access to hangars and/or other indoor maintenance or repair facilities may be restricted, since some types of aircraft may not fit through the entrances of such facilities due to the large footprint of the aircraft.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
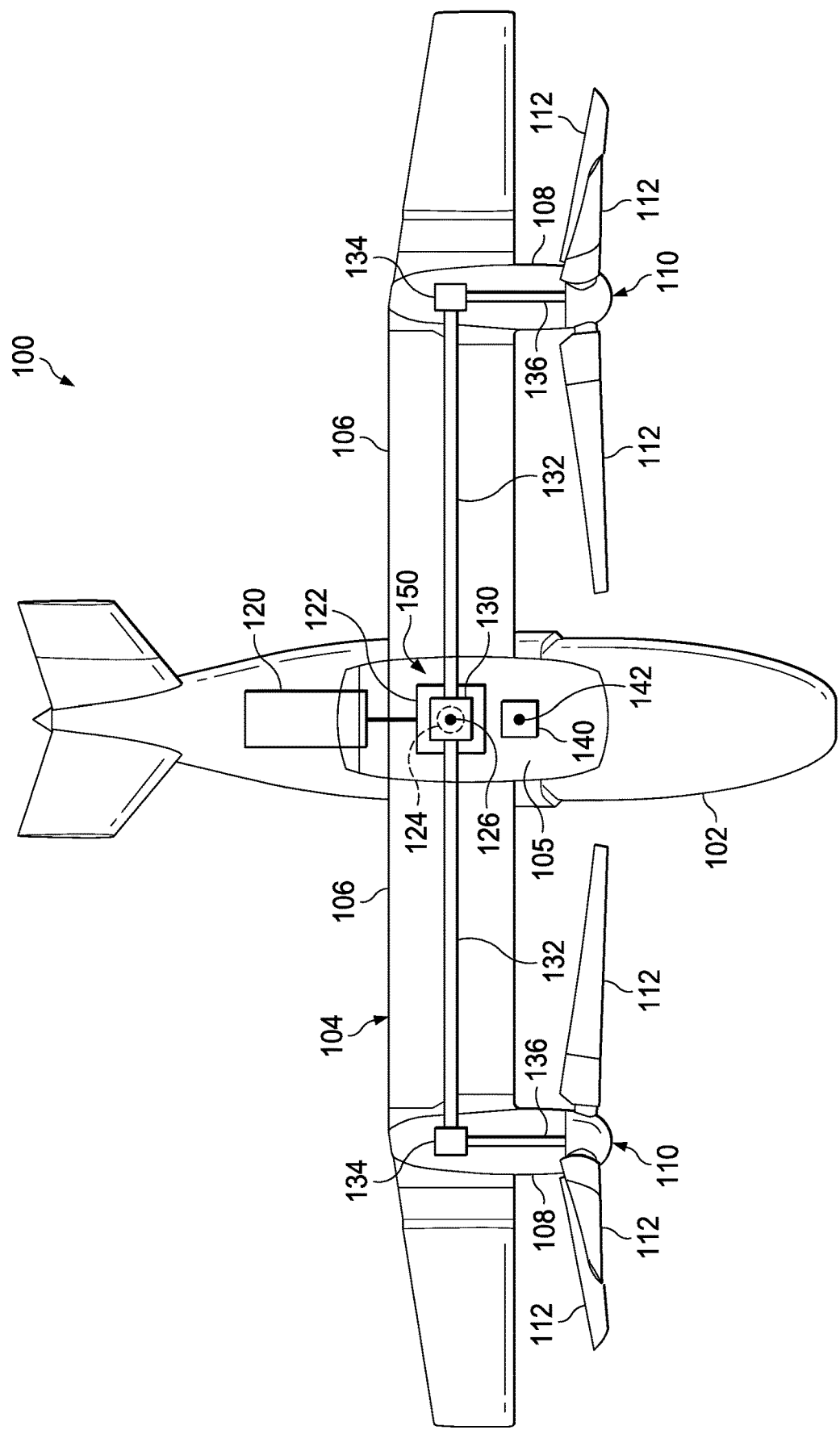
FIG. 1 is a top view of an aircraft according to this disclosure with a wing assembly configured in a flight position.
Figure 2:
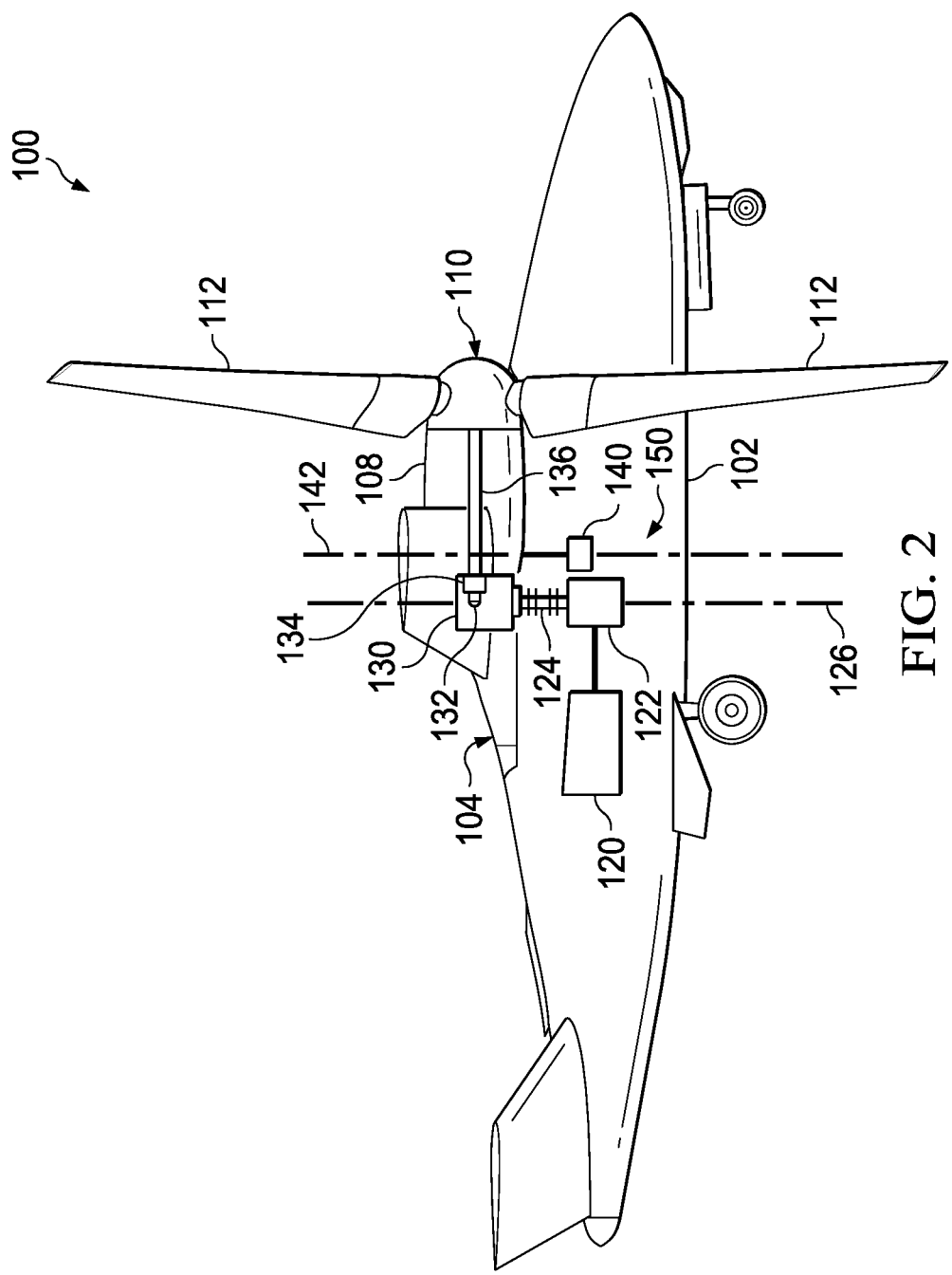
FIG. 2 is a side view of the aircraft of FIG. 1 with a retractable driveshaft assembly engaged with a mid-wing gearbox and the wing assembly configured in the flight position.

Referring now to FIGS. 1 and 2, a top view and a side view of an aircraft 100 are shown according to this disclosure. In the embodiment shown, aircraft 100 is a tiltrotor. However, in other embodiments, aircraft 100 may be any other type of aircraft (e.g. fixed-wing aircraft, vertical take-off and landing (VTOL) aircraft, "manned" or "unmanned" drone, etc.). Aircraft 100 generally comprises a fuselage 102 and a stowable wing assembly 104 comprising a selectively rotatable wing body 105 and a plurality of wings 106 extending therefrom. Each wing 106 comprises a pylon 108 comprising a rotor assembly 110 having a plurality of rotor blades 112 coupled thereto. Each pylon 108 is selectively pivotable between a horizontal orientation and a vertical orientation with respect to the fuselage 102 and associated wing 106 to adjust the thrust angle and transition the aircraft 100 between an airplane mode and a helicopter mode. Accordingly, the airplane mode is associated with a more horizontally-oriented thrust angle and propelling the aircraft 100 forward in flight, while the helicopter mode is associated with a more vertically-oriented thrust angle and propelling the aircraft 100 to and from a landing area.

Aircraft 100 also comprises a drive component carried in the fuselage 102. In the embodiment shown, the drive component comprises an internal combustion engine 120 coupled to an engine reduction gearbox ("ERGB") 122 comprising a retractable driveshaft assembly 124. However, in other embodiments, the drive component may comprise a direct-drive electric motor, a direct-drive engine, a motor and gearbox combination, or an engine and a redirection gearbox, each comprising a retractable driveshaft assembly 124. In the embodiment shown, operation of the internal combustion engine 120 causes the retractable driveshaft assembly 124 to rotate about its rotation axis 126. The retractable driveshaft assembly 124 is selectively extended and retracted axially along rotation axis 126 to engage and disengage a gearbox. In the embodiment shown, the gearbox is a mid-wing gearbox ("MWGB") 130 disposed within the selectively rotatable wing body 105 of the wing assembly 104. The retractable driveshaft assembly 124 may be actuated electrically, electro-mechanically, hydraulically, and/or mechanically via an actuation shaft. Further, while in the embodiment shown, the retractable driveshaft assembly 124 is selectively actuated and retracted vertically with respect to the fuselage 102, in other embodiments, the retractable driveshaft assembly 124 may be selectively actuated and retracted longitudinally along a length of the fuselage 102 and/or laterally with respect to the fuselage 102.

The MWGB 130 is operatively coupled to an interconnect driveshaft 132 extending therefrom through each wing 106 to a pylon gearbox 134 disposed in each pylon 108. Each pylon gearbox 134 is coupled to the associated rotor assemblies 110 through a rotor mast 136. Thus, when the retractable driveshaft assembly 124 engages the MWGB 130, rotation of the retractable driveshaft assembly 124 imparted by the internal combustion engine 120 is transmitted through the MWGB 130 to the interconnect driveshafts 132 and the rotor masts 136 to impart rotation to the counter-rotating rotor assemblies 110. Conversely, when the retractable driveshaft assembly 124 disengages the MWGB 130, rotation of the retractable driveshaft assembly 124 will not impart rotation to the rotor assemblies 110. As such, the retractable driveshaft assembly 124 allows operation of the internal combustion engine 120 without engaging the rotor assemblies 110 in order to perform pre-flight checks, provide electrical power, and/or provide functions of an auxiliary power unit (APU). Additionally, in some embodiments, aircraft 100 may also comprise a wing assembly rotation system 140 configured to selectively rotate the wing assembly 104 with respect to the fuselage 102 about a stow axis 142 between a flight position (shown in FIGS. 1 and 2) and a stowed position (shown in FIG. 3) when the retractable driveshaft assembly 124 is disengaged from the MWGB 130. Additionally, as shown in FIG. 2, it will be appreciated that the retractable driveshaft assembly 124 is engaged with the MWGB 130.

Figure 3:
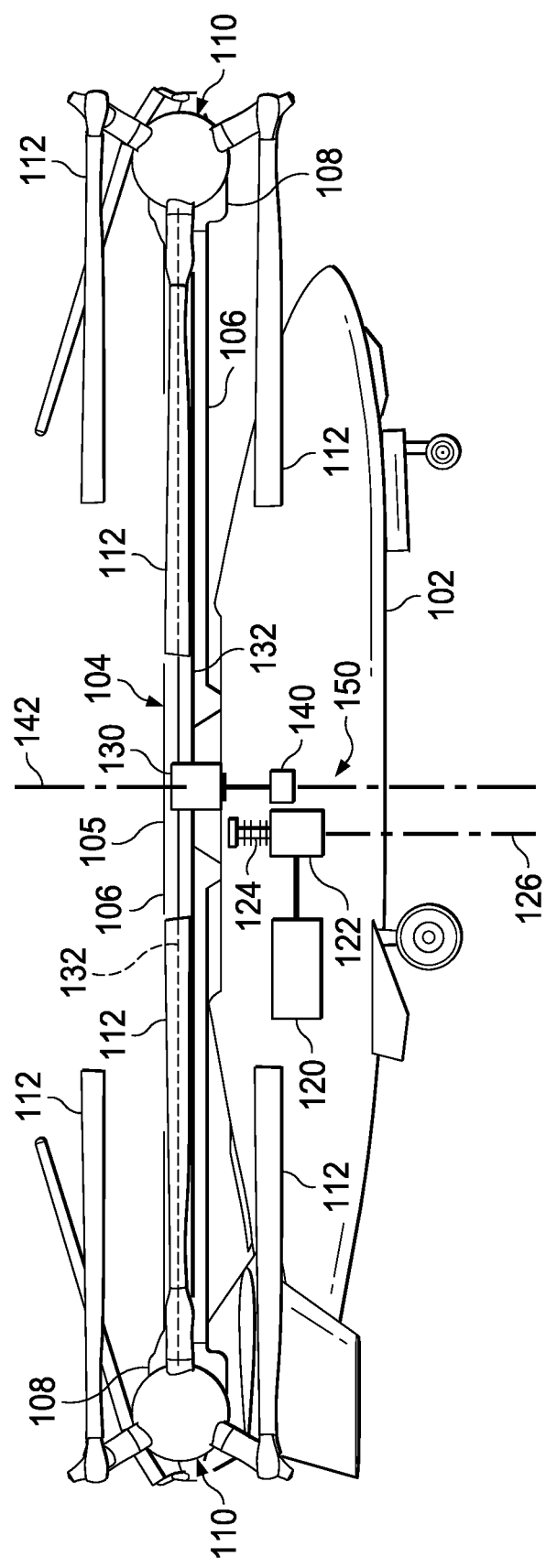
FIG. 3 is a side view of the aircraft of FIG. 1 with the retractable driveshaft assembly disengaged from the mid-wing gearbox and the wing assembly configured in the stowed position.

Referring now to FIG. 3, a side view of the aircraft 100 of FIGS. 1 and 2 is shown according to this disclosure. Aircraft 100 is shown with the retractable driveshaft assembly 124 disengaged from the MWGB 130 and the wing assembly 104 configured in the stowed position. As shown, the retractable driveshaft assembly 124 is selectively retracted vertically to disengage the MWGB 130. After the retractable driveshaft assembly 124 disengages the MWGB 130, the wing assembly 104 may be selectively rotated relative to the fuselage 102 about the stow axis 142 in a clockwise direction as viewed from the top of the aircraft 100 until the wing assembly 104 reaches the stowed position. In the stowed position, it will be appreciated that the retractable driveshaft assembly 124 is misaligned from the MWGB 130. In some embodiments, the stowed configuration of the wing assembly 104 may be reached after the wing assembly 104 is rotated about ninety degrees. In alternative embodiments, the wing assembly 104 may be rotated relative to the fuselage 102 about the stow axis 142 in a counter-clockwise direction. The ERGB 122 comprising the retractable driveshaft assembly 124 and the MWGB 130 may be referred to as the drive system 150 of aircraft 100.

Figure 4:
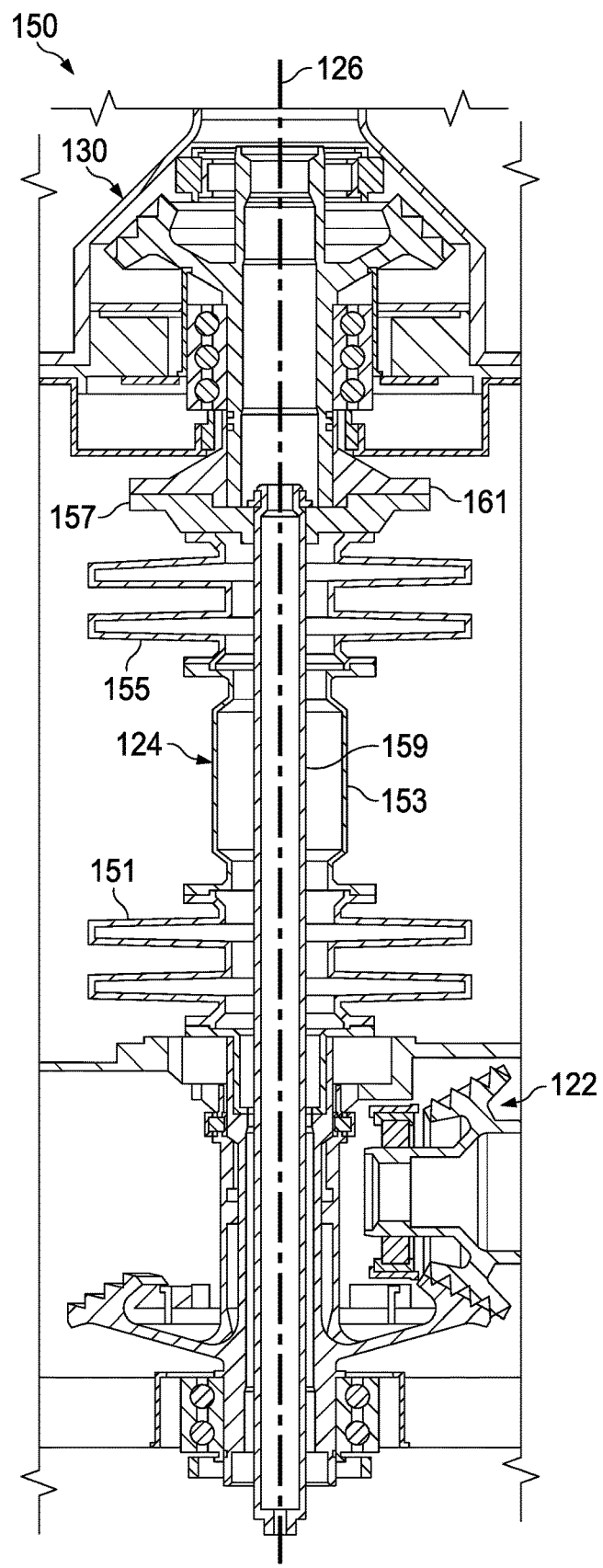
FIG. 4 is a cross-sectional side view of a drive system according to this disclosure with the retractable driveshaft assembly engaged with the mid-wing gearbox.
Figure 5:
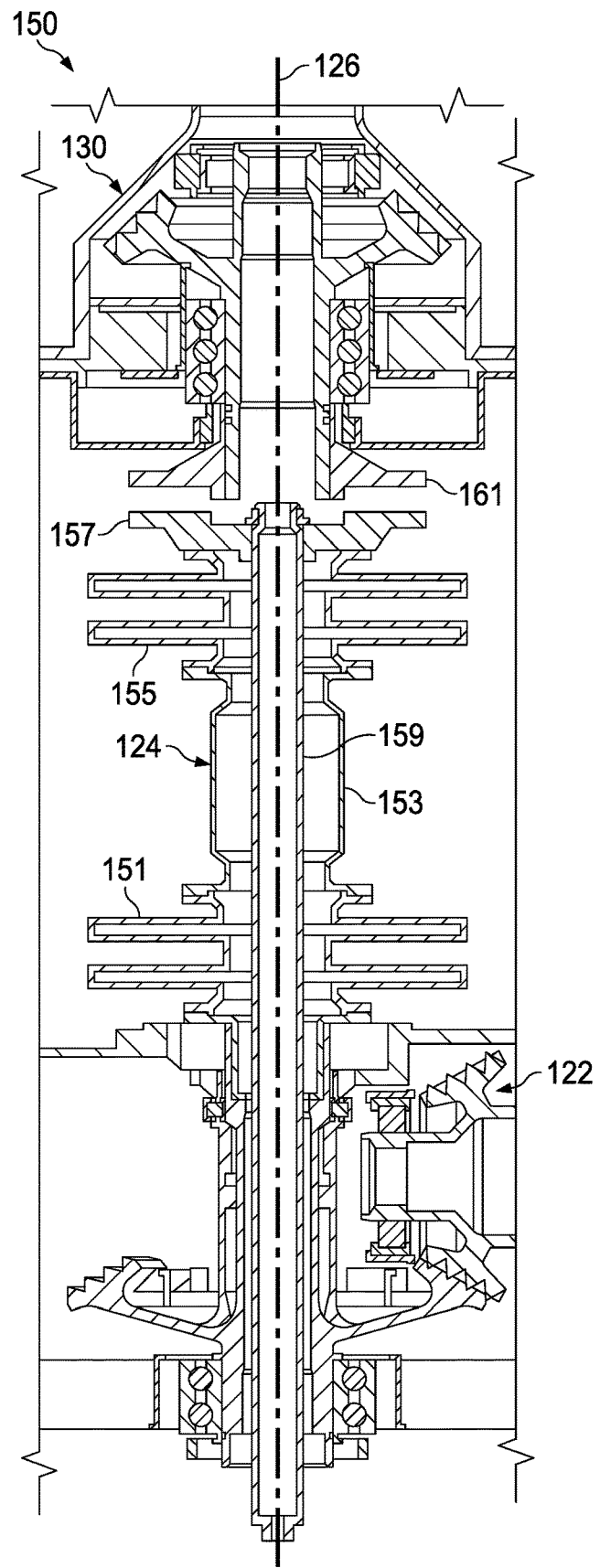
FIG. 5 is a cross-sectional side view of the drive system of FIG. 4 with the retractable driveshaft assembly disengaged from the mid-wing gearbox.

Referring now to FIGS. 4 and 5, cross-sectional side views of the drive system 150 of FIGS. 1-3 are shown according to this disclosure with the retractable driveshaft assembly 124 engaged and disengaged with the MWGB 130, respectively. Engagement of the retractable driveshaft assembly 124 shown in FIG. 4 corresponds to FIGS. 1 and 2, while disengagement of the retractable driveshaft assembly 124 shown in FIG. 5 corresponds to FIG. 3. Drive system 150 comprises the ERGB 122 comprising the retractable driveshaft assembly 124 and the MWGB 130. The retractable driveshaft assembly 124 comprises a compressible lower coupling 151, a driveshaft 153, a compressible upper coupling 155, an ERGB friction plate 157, and an actuator shaft 159. The MWGB 130 also comprises a MWGB friction plate 161 configured to interface with the ERGB friction plate 157 to provide the selective engagement and disengagement of the retractable driveshaft assembly 124 with the MWGB 130.

Generally, the lower coupling 151 is operatively connected to the ERGB 122 and a lower end of the driveshaft 153. The upper coupling 155 is operatively connected to an upper end of the driveshaft 153. As such, the driveshaft 153 is disposed between and interconnects the lower coupling 151 and the upper coupling 155. Further, the ERGB friction plate 157 is operatively connected to an upper end of the upper coupling 155. By operatively connecting the components of the retractable driveshaft assembly 124, it will be appreciated that the lower coupling 151, the driveshaft 153, the upper coupling 155, and the ERGB friction plate 157 collectively rotate as a single assembly. In alternative embodiments, the retractable driveshaft assembly 124 may comprise only one coupling 151, 155. Furthermore, the actuator shaft 159 is disposed through a central bore in each of the lower coupling 151, the driveshaft 153, and the upper coupling 155. In some embodiments, the actuator shaft 159 may be disposed at least partially through the ERGB friction plate 157. Additionally, in some embodiments, the actuator shaft 159 may at least partially extend through a central bore disposed in the MWGB friction plate 161.

In operation, the retractable driveshaft assembly 124 is configured to selectively extend and retract to engage and disengage the MWGB 130, respectively. More specifically, the actuator shaft 159 may be actuated electronically, electro-mechanically, magnetically, mechanically, pneumatically, or hydraulically to selectively engage and disengage the ERGB friction plate 157 from the MWGB friction plate 161. Accordingly, the friction plates 157, 161 comprise a torque transfer device, clutch mechanism, or other style friction-initiated interface that produces a sufficient static friction to transfer and deliver torque from the retractable driveshaft assembly 124 to the MWGB 130 in order to transfer rotation of the retractable driveshaft assembly 124 to the MWGB 130. Thus, when the friction plates 157, 161 make contact with sufficient force to prevent slippage, the retractable driveshaft assembly 124 is engaged with the MWGB 130, such that friction between the friction plates 157, 161 allows rotation of the retractable driveshaft assembly 124 to be imparted to the MWGB 130.

To disengage the retractable driveshaft assembly 124 from the MWGB 130, the actuator shaft 159 is selectively actuated along rotation axis 126 in a downward direction to apply a compressive force to the lower coupling 151 and the upper coupling 155. The compression of the lower coupling 151 and the upper coupling 155 displaces the ERGB friction plate 157 in a downward direction in order to break contact between the ERGB friction plate 157 and the MWGB friction plate 161, thereby disengaging the retractable driveshaft assembly 124 from the MWGB 130. Accordingly, when the retractable driveshaft assembly 124 is disengaged from the MWGB 130, rotation of the retractable driveshaft assembly 124 will not impart rotation to the MWGB 130 and consequently the rotor assemblies 110 of aircraft 100. When the retractable driveshaft assembly 124 is disengaged from the MWGB 130, it will be appreciated that the combustion engine 120 of the aircraft 100 may be started or operated without rotating the rotor assemblies 110. This allows a pilot or operator to perform pre-flight checks of hydraulics or other systems of the aircraft 100 without engaging the rotor assemblies 110.

To engage retractable driveshaft assembly 124 with the MWGB 130, the actuator shaft 159 is selectively actuated along rotation axis 126 in an upward direction to at least partially relieve the compressive force in the lower coupling 151 and the upper coupling 155. Relieving the compressive force in the couplings 151, 155 displaces the ERGB friction plate 157 in an upward direction to create contact between the ERGB friction plate 157 and the MWGB friction plate 161, thereby engaging the retractable driveshaft assembly 124 with the MWGB 130. In some embodiments, the couplings 151, 155 may be preloaded when the friction plates 157, 161 make contact. Thus, when the retractable driveshaft assembly 124 is engaged with the MWGB 130, rotation of the retractable driveshaft assembly 124 imparts rotation to the MWGB 130 and consequently the rotor assemblies 110 of aircraft 100. It will be appreciated that the friction plates 157, 161 are designed such that upon engagement, the friction plates 157, 161 handle the torque imparted by the retractable driveshaft assembly 124, allowing the rotor assemblies 110 to match the rotational speed of the retractable driveshaft assembly 124. Further, in some embodiments, the friction plates 157, 161 may comprise a slip feature configured to balance a static friction margin to avoid over-torquing the interconnect driveshafts 132, the rotor masts 136, and/or the rotor assemblies 110.

Figure 6:
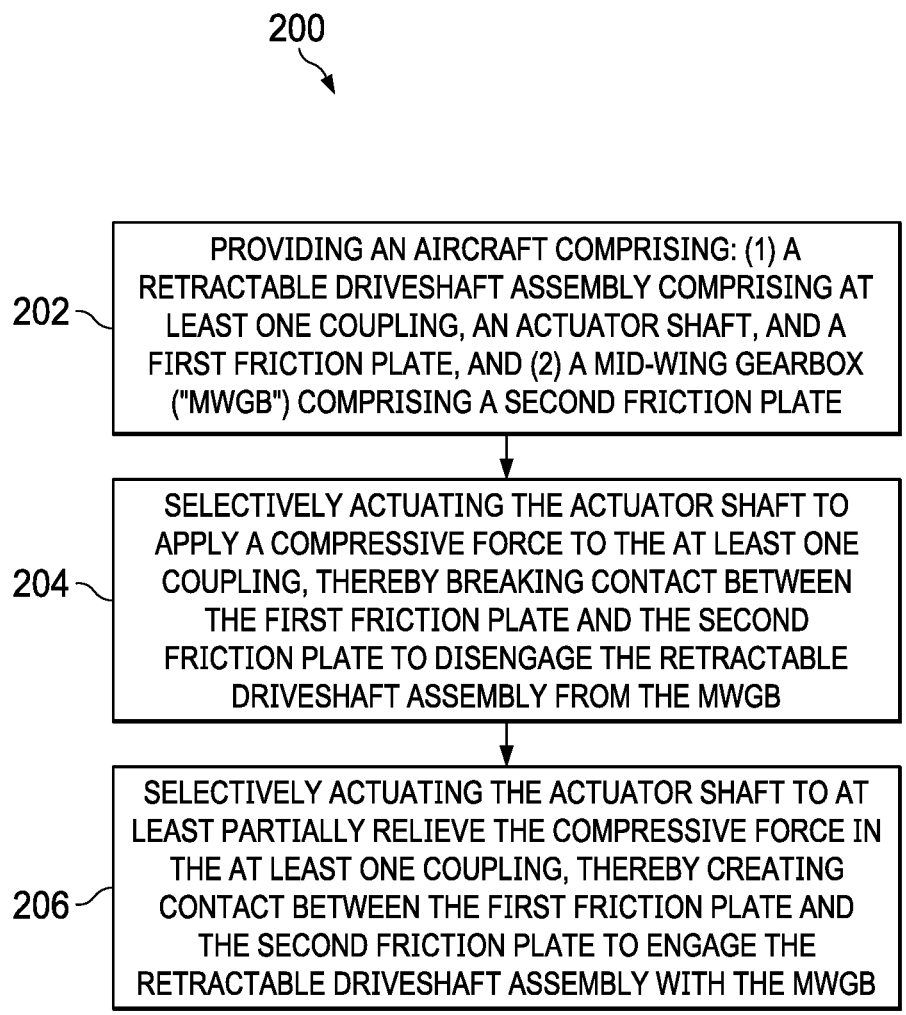
FIG. 6 is a flowchart of a method of operating an aircraft according to this disclosure.

Referring now to FIG. 6, a flowchart of a method 200 of operating an aircraft 100 is shown according to this disclosure. The method 200 may begin at block 202 by providing an aircraft 100 comprising: (1) a retractable driveshaft assembly 124 comprising at least one coupling 151, 155, an actuator shaft 159, and a first friction plate 157, and (2) a mid-wing gearbox ("MWGB") 130 comprising a second friction plate 161. The method 200 may continue at block 204 by selectively actuating the actuator shaft 159 to apply a compressive force to the at least one coupling 151, 155, thereby breaking contact between the first friction plate 157 and the second friction plate 161 to disengage the retractable driveshaft assembly 124 from the MWGB 130. The method 200 may conclude at block 206 by selectively actuating the actuator shaft 159 to at least partially relieve the compressive force in the at least one coupling 151, 155, thereby creating contact between the first friction plate 157 and the second friction plate 161 to engage the retractable driveshaft assembly 124 with the MWGB 130.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, where k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only or any combination of A, B, and C.

What is claimed is:

1. A drive system, comprising:
   a drive component comprising a retractable driveshaft assembly having a rotation axis, a first friction plate, and at least one compressible coupling that is selectively compressible along the rotation axis, wherein torque is transferred through the compressible coupling; and
   a gearbox comprising a second friction plate;
   wherein actuation of the retractable driveshaft assembly causes the first friction plate to selectively engage and disengage the second friction plate to engage and disengage the drive component and the gearbox.

2. The drive system of claim 1, wherein the at least one compressible coupling is coupled to a driveshaft of the retractable driveshaft assembly.

3. The drive system of claim 2, wherein the first friction plate is coupled to the at least one compressible coupling.

4. The drive system of claim 3, wherein the retractable driveshaft assembly comprises an actuator shaft disposed through a central bore in the at least one compressible coupling and the driveshaft.

5. The drive system of claim 4, wherein actuation of the retractable driveshaft assembly is accomplished via axially translatable motion of the actuator shaft along the rotation axis of the retractable driveshaft assembly.

6. The drive system of claim 5, wherein the actuator shaft is selectively actuated to apply a compressive force to the at least one compressible coupling to displace the first friction plate in order to break contact between the first friction plate and the second friction plate, thereby disengaging the retractable driveshaft assembly from the gearbox.

7. The drive system of claim 6, wherein the actuator shaft is selectively actuated to at least partially relieve the compressive force in the at least one compressible coupling to displace the first friction plate to create contact between the first friction plate and the second friction plate, thereby engaging the retractable driveshaft assembly with the gearbox.

8. An aircraft, comprising:
   a drive component comprising a retractable driveshaft assembly having a rotation axis, a first friction plate, and at least one compressible coupling that is selectively compressible along the rotation axis, wherein torque is transferred through the compressible coupling, the drive component being disposed in a fuselage of the aircraft; and
   a gearbox comprising a second friction plate, the gearbox disposed in a wing assembly of the aircraft;
   wherein actuation of the retractable driveshaft assembly causes the first friction plate to selectively engage and disengage the second friction plate to engage and disengage the drive component and the gearbox.

9. The aircraft of claim 8, wherein the wing assembly is capable of selective rotation with respect to the fuselage when the first friction plate is disengaged with the second friction plate.

10. The aircraft of claim 8, wherein the at least one compressible coupling is coupled to a driveshaft of the retractable driveshaft assembly.

11. The aircraft of claim 10, wherein the retractable driveshaft assembly comprises an actuator shaft disposed through a central bore in the at least one compressible coupling and the driveshaft.

12. The aircraft of claim 11, wherein actuation of the retractable driveshaft assembly is accomplished via axially translatable motion of the actuator shaft along the rotation axis of the retractable driveshaft assembly.

13. The aircraft of claim 12, wherein the actuator shaft is selectively actuated to apply a compressive force to the at least one compressible coupling to displace the first friction plate in order to break contact between the first friction plate and the second friction plate, thereby disengaging the retractable driveshaft assembly from the gearbox.

14. The aircraft of claim 13, wherein the actuator shaft is selectively actuated to at least partially relieve the compressive force in the at least one compressible coupling to displace the first friction plate to create contact between the first friction plate and the second friction plate, thereby engaging the retractable driveshaft assembly with the gearbox.

15. The aircraft of claim 14, wherein the gearbox is a mid-wing gearbox ("MWGB"), and wherein rotation of the retractable driveshaft imparts rotation to at least one rotor assembly coupled to the MWGB when the first friction plate contacts the second friction plate to engage the retractable driveshaft assembly with the MWGB.

16. A method of operating an aircraft, comprising:
   providing an aircraft comprising: (1) a retractable driveshaft assembly comprising a rotation axis, at least one compressible coupling, an actuator shaft, and a first friction plate, and (2) a gearbox comprising a second friction plate;
   selectively actuating the actuator shaft to apply a compressive force to the at least one coupling along the rotation axis, thereby breaking contact between the first friction plate and the second friction plate to disengage the retractable driveshaft assembly from the gearbox; and
   selectively actuating the actuator shaft to at least partially relieve the compressive force in the at least one coupling along the rotation axis, thereby creating contact between the first friction plate and the second friction plate to engage the retractable driveshaft assembly with the gearbox transferring torque through the compressible coupling.

17. The method of claim 16, further comprising: selectively actuating the actuator shaft to create contact between the first friction plate and the second friction plate when the retractable driveshaft assembly is rotating.

18. The method of claim 16, further comprising: rotating a wing assembly of the aircraft when the retractable driveshaft assembly is disengaged from the gearbox.

19. The method of claim 16, further comprising: operating a combustion engine of the aircraft when the retractable driveshaft assembly is disengaged from the gearbox without rotating rotor assemblies of the aircraft.

* * * * *